United States Patent
Lee

(10) Patent No.: US 9,899,936 B2
(45) Date of Patent: *Feb. 20, 2018

(54) OFFSET VOLTAGE GENERATOR AND METHOD FOR GENERATING AN OFFSET VOLTAGE OF THREE-PHASE INVERTER

(71) Applicant: LSIS CO., LTD., Gyeonggi-do (KR)

(72) Inventor: Hak-Jun Lee, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/098,238

(22) Filed: Apr. 13, 2016

(65) Prior Publication Data

US 2016/0308460 A1    Oct. 20, 2016

(30) Foreign Application Priority Data

Apr. 14, 2015  (KR) .................. 10-2015-0052598

(51) Int. Cl.
*H02M 7/5387* (2007.01)
*H02M 7/44* (2006.01)
(Continued)

(52) U.S. Cl.
CPC .............. *H02M 7/44* (2013.01); *H02M 1/12* (2013.01); *H02M 7/53873* (2013.01);
(Continued)

(58) Field of Classification Search
CPC .. H02P 6/157; H02P 6/153; H02P 6/15; H02P 6/14; H02P 6/08; H02M 2007/4803;
(Continued)

(56) References Cited

U.S. PATENT DOCUMENTS 6,333,569 B1    12/2001 Kim
2009/0200970 A1*  8/2009 Kimura ................. H02P 27/08
                                                    318/400.3

(Continued)

FOREIGN PATENT DOCUMENTS

JP    S62-277064 A    12/1987
JP    H0270293 A      3/1990
(Continued)

OTHER PUBLICATIONS

Office Action dated Apr. 11, 2017 issued in corresponding Japanese Application No. 2016-079517.
(Continued)

*Primary Examiner* — Timothy J Dole
*Assistant Examiner* — Bryan R Perez
(74) *Attorney, Agent, or Firm* — K&L Gates LLP

(57) ABSTRACT

In one embodiment, an offset voltage generator includes a first limiter configured to compare a first phase-voltage signal with a maximum limit value and a minimum limit value to output a first limit-voltage signal; a second limiter configured to compare a second phase-voltage signal with the maximum limit value and the minimum limit value to output a second limit-voltage signal; a third limiter configured to compare a third phase-voltage signal with the maximum limit value and the minimum limit value to output a third limit-voltage signal; and a summer configured to add a difference between the first phase-voltage signal and the first limit-voltage signal, a difference between the second phase-voltage signal and the second limit-voltage signal, and a difference between the third phase-voltage signal and the third limit-voltage signal, to output an offset voltage.

8 Claims, 10 Drawing Sheets

(51) Int. Cl.
*H02M 1/12* (2006.01)
*H02P 27/08* (2006.01)
*H02M 1/00* (2006.01)
*H02M 7/483* (2007.01)
*H02M 7/497* (2007.01)

(52) U.S. Cl.
CPC ............ *H02P 27/08* (2013.01); *H02P 27/085* (2013.01); *H02M 7/483* (2013.01); *H02M 7/497* (2013.01); *H02M 2001/0025* (2013.01); *H02M 2007/53876* (2013.01); *H02P 2209/13* (2013.01)

(58) Field of Classification Search
CPC ... H02M 2001/0048; H02M 2001/123; H02M 7/525; H02M 7/5387; H02M 7/48; H02M 7/44; H02M 7/42; H02M 7/483; H02M 7/487; H02M 7/49; H02M 7/497; H02M 7/501; H02M 3/156; H02M 3/158; H02M 1/08
See application file for complete search history.

(56) References Cited

U.S. PATENT DOCUMENTS

| | | |
|---|---|---|
| 2012/0249043 A1 | 10/2012 | Soares |
| 2012/0249046 A1* | 10/2012 | Soares .................... H02P 27/08 |
| | | 318/811 |

FOREIGN PATENT DOCUMENTS

| | | |
|---|---|---|
| JP | 05-268773 A | 10/1993 |
| JP | 10-052062 A | 2/1998 |
| JP | 2005-137076 A | 5/2005 |
| JP | 3677804 B2 | 8/2005 |
| KR | 100168807 B1 | 10/1998 |
| KR | 20020023581 A | 3/2002 |
| KR | 101421017 B1 | 7/2014 |

OTHER PUBLICATIONS

Search report dated Dec. 16, 2016 for related EP application 16160443.4.

* cited by examiner

OFFSET VOLTAGE GENERATOR AND METHOD FOR GENERATING AN OFFSET VOLTAGE OF THREE-PHASE INVERTER

CROSS REFERENCE TO RELATED APPLICATION

This application claims the benefit of Korean Patent Application No. 10-2015-0052598, filed on Apr. 14, 2015, which is hereby incorporated by reference in its entirety.

BACKGROUND

Technical Field

The present disclosure relates to an offset voltage generator and a method for generating an offset voltage for controlling continuous modulation and discontinuous modulation of a three-phase inverter.

Description of the Related Art

As power semiconductor technology evolves, it has become easier to implement variable voltage and variable frequency (VVVF) driver by using power devices that can be switched at high speed. A voltage source inverter that typically receives DC voltage source to generate AC variable voltage source is commonly employed as a circuit for generating variable voltage variable frequency. Such a voltage source inverter is commonly employed by energy storage system (ESS), PV inverter, motor drive technologies.

In modulating voltage generated by such a voltage source inverter, a variety of types of modulation schemes may be employed. One of the most commonly used modulation scheme is pulse width modulation (PWM) scheme. The PWM scheme may be divided into continuous modulation scheme and discontinuous modulation scheme. Examples of the continuous modulation mode may include sinusoidal PWM (SPWM), space vector PWM (SVPWM), etc. Examples of the discontinuous modulation mode may include 60° discontinuous PWM (DPWM) for reducing switching loss of a power semiconductor.

In such continuous or discontinuous modulation modes, an offset voltage is compared to a carrier wave such as a triangular wave to modulate voltage. In doing so, different offset voltages are used in the continuous and discontinuous modulation modes. In the related art, there is a problem in that when a three-phase inverter is switched from the continuous modulation mode to the discontinuous modulation mode, an offset voltage for the discontinuous modulation mode has to be calculated according to a modulation index MI. In addition, according to existing voltage modulation scheme using offset voltage, offset voltage is continuously introduced even in a period where the offset voltage is not necessary, and thus zero sequence voltage always exists in the inverter.

SUMMARY

It is an aspect of some embodiments of the present disclosure to provide an offset voltage generator and a method for generating an offset voltage of a three-phase inverter that allow the voltage modulation mode of the three-phase inverter to easily switch from a continuous modulation mode to a discontinuous modulation mode without any additional calculating process.

It is another aspect of some embodiments of the present disclosure to provide an offset voltage generator and a method for generating an offset voltage of a three-phase inverter that adjust the discontinuous modulation period, such that total harmonic distortion (THD) can be reduced in a period where the modulation index is low compared to the discontinuous modulation scheme in the related art, and switching loss can be reduced in a period where the modulation index is high compared to the continuous modulation scheme in the related art.

It is yet another aspect of some embodiments of the present disclosure to provide an offset voltage generator and a method for generating an offset voltage of a three-phase inverter that generate an offset voltage having the minimum (root mean square) RMS such that unnecessary zero sequence voltage can be reduced.

Other objects of the present disclosure are not limited to the above-described object and other objects and advantages can be appreciated by the following description described with reference to the embodiments of the present disclosure. Further, it will be easily appreciated that the objects and advantages of the present disclosure can be realized by means and a combination thereof recited in the appended claims.

In accordance with one aspect of some embodiments of the present disclosure, an offset voltage generator includes: a first limiter configured to compare a first phase-voltage signal with a maximum limit value and a minimum limit value to output a first limit-voltage signal; a second limiter configured to compare a second phase-voltage signal with the maximum limit value and the minimum limit value to output a second limit-voltage signal; a third limiter configured to compare a third phase-voltage signal with the maximum limit value and the minimum limit value to output a third limit-voltage signal; and a summer configured to add a difference between the first phase-voltage signal and the first limit-voltage signal, a difference between the second phase-voltage signal and the second limit-voltage signal, and a difference between the third phase-voltage signal and the third limit-voltage signal, to output an offset voltage. The maximum limit value and the minimum limit value are determined by DC link voltage of the three-phase inverter.

In accordance with another aspect of some embodiments of the present disclosure, a three-phase inverter control device for controlling switching operations of a plurality of switching elements in a three-phase inverter includes: a pole-voltage signal generator configured to compare a first phase-voltage signal, a second phase-voltage signal and a third phase-voltage signal with a maximum limit value and a minimum limit value, respectively, to generate an offset voltage, and add the offset voltage to the first phase-voltage signal, the second phase-voltage signal and the third phase-voltage signal to generate a first pole-voltage signal, a second pole-voltage signal and a third pole-voltage signal, respectively; and a control signal generator configured to compare the first pole-voltage signal, the second pole-voltage signal and the third pole-voltage signal with a carrier wave, to generate a control signal for the plurality of switching elements, wherein the maximum limit value and the minimum limit value are determined by a DC link voltage of the three-phase inverter.

As set forth above, according to an embodiment of the present disclosure, the voltage modulation mode of a three-phase inverter can be easily switched from the continuous modulation mode to the discontinuous modulation mode without any additional calculating process.

In addition, according to an embodiment of the present disclosure, a discontinuous modulation period is adjusted, such total harmonic distortion (THD) can be reduced in a period where the modulation index is low compared to the discontinuous modulation scheme in the related art, and switching loss can be reduced in a period where the modulation index is high compared to the continuous modulation scheme in the related art.

Moreover, according to an embodiment of the present disclosure, an offset voltage having the minimum RMS is generated, such that unnecessary zero sequence voltage can be reduced.

DETAILED DESCRIPTION

Figure 1:
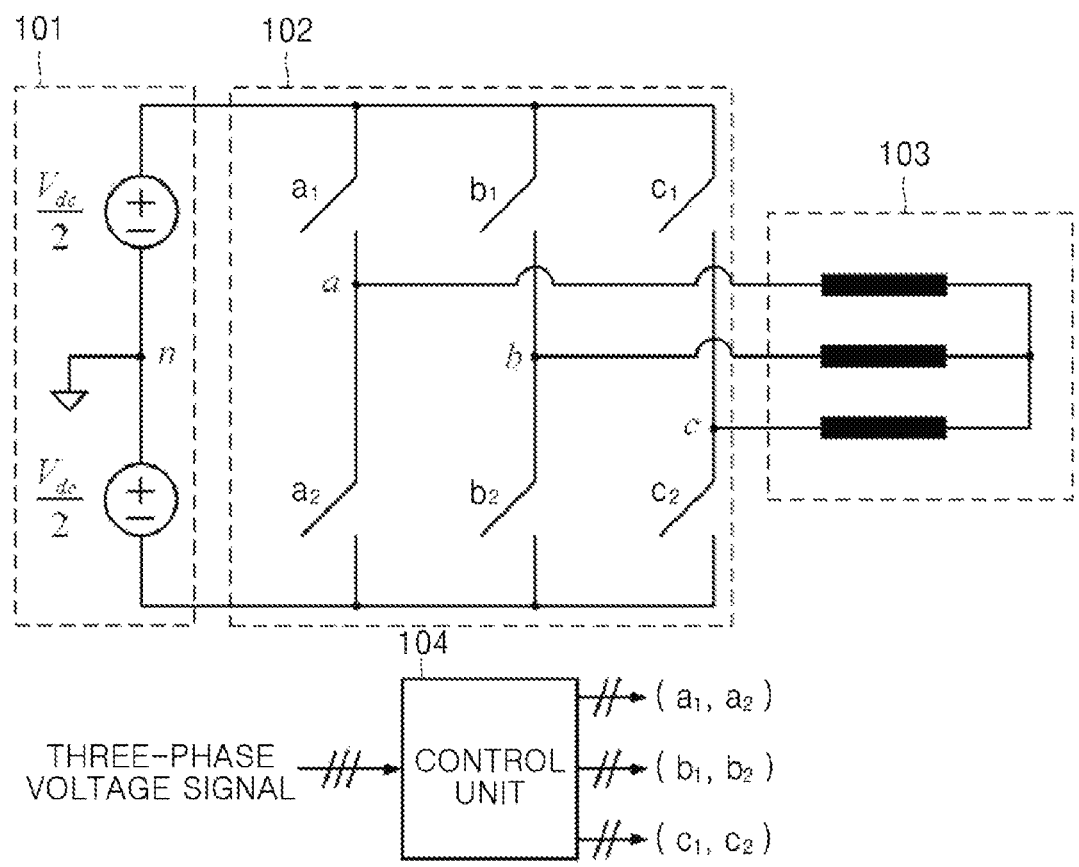
FIG. 1 shows an example of a three-phase inverter to which a method for generating an offset voltage of a three-phase inverter according to an embodiment of the present disclosure is applied.

The above objects, features and advantages will become apparent from the detailed description with reference to the accompanying drawings. Embodiments are described in sufficient detail to enable those skilled in the art in the art to easily practice the technical idea of the present disclosure. Detailed disclosures of well-known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

FIG. 1 shows an example of a three-phase inverter to which a method for generating an offset voltage of a three-phase inverter according to an embodiment of the present disclosure is applied. The three-phase inverter shown in FIG. 1 is a typical two-level three-phase voltage source inverter used in driving an ESS or motor drive.

Referring to FIG. 1, the three-phase inverter includes a smoothing part 101 and a switching part 102. The three-phase inverter rectifies a three-phase AC voltage from an external device to a DC voltage by a rectifier (not shown). The rectified DC voltage is smoothed via the smoothing part 101 shown in FIG. 1 to DC link voltages of $V_{dc}/2$ at two DC links. The symbol n in FIG. 1 represents a virtual DC link neutral point.

The smoothed DC link voltages $V_{dc}/2$ are converted to a three-phase AC voltage via a number of switching elements a1, a2, b1, b2, c1 and c2 in the switching part 102. The switching element a1 and the switching element a2 are turned on/off in a complementary fashion. Likewise, the switching element b1 and the switching element b2 are turned on/off in a complementary fashion, and the switching element c1 and the switching element c2 are turned on/off in a complementary fashion.

The three-phase AC voltage generated via the switching operations of the switching unit 102 is input to a load 103 such as an electric motor.

The switching elements a1, a2, b1, b2, c1 and c2 in the switching part 102 are turned on/off in a complementary fashion, respectively, to generate a three-phase AC voltage. The switching operations (on/off operations) of the switching elements a1, a2, b1 b2, c1 and c2 are performed in accordance with control signals output from a PWM control unit 104 as shown in FIG. 1. The PWM control unit 104 generates control signal for controlling the switching operations of the switching elements a1, a2, b1, b2, c1 and c2 using a three-phase voltage signal input from an external device.

Figure 2:
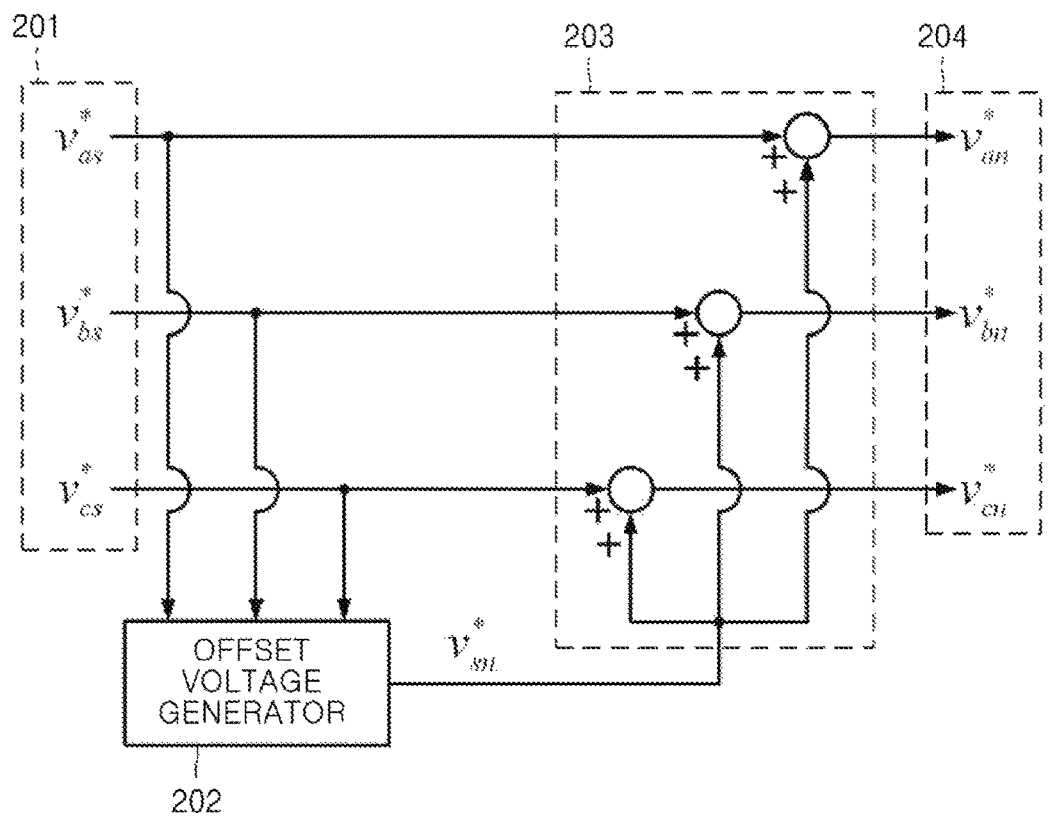
FIG. 2 shows a process of generating a three-phase pole voltage signal by a pole voltage signal generator in the PWM control unit in the related art.

FIG. 2 shows a process of generating a three-phase pole voltage signal by a pole voltage signal generator in the PWM control unit 104 in the related art.

Referring to FIG. 2, the pole-voltage signal generator in the PWM control unit 104 adds three phase-voltage signals 201 including a first phase-voltage signal $V^*_{as}$, a second phase-voltage signal $V^*_{bs}$ and a third phase-voltage signal $V^*_{cs}$ to an offset voltage $V^*_{sn}$ generated in an offset voltage generator 202, respectively, thereby generating three-phase pole-voltage signals 203 including a first pole-voltage signal $V^*_{an}$, a second pole-voltage signal $V^*_{bn}$ and a third pole-voltage signal The offset voltage $V^*_{sn}$ is a component that commonly exists in the pole-voltage signals 203, and is a zero sequence voltage such that it does not affect the combination of phase-to-phase voltages.

Accordingly, the relationship is established among the pole-voltage signals 203, the phase-voltage signals 201 and the offset voltage signal $V^*_{sn}$ as expressed in Equation 1:

$$v^*_{an} = v^*_{as} + v^*_{sn}$$

$$v^*_{bn} = v^*_{bs} + v^*_{sn}$$

$$v^*_{cn} = v^*_{cs} + v^*_{sn} \qquad \text{[Equation 1]}$$

Figure 3:
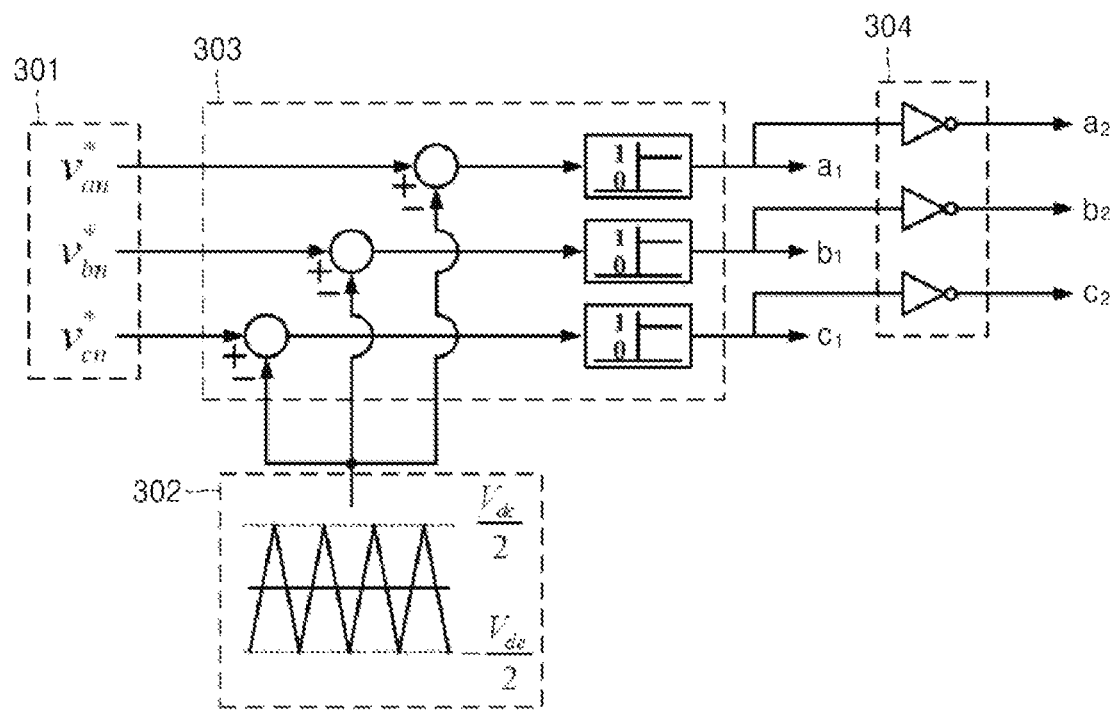
FIG. 3 shows a process that a control signal generator in the PWM control unit generates a control signal for switching elements by using three-phase pole-voltage signals in the related art.

FIG. 3 shows a process that a control signal generator in the PWM control unit 104 generates a control signal for switching elements by using three-phase pole-voltage signals in the related art.

The pole-voltage signals 301 generated via the process of FIG. 2, i.e., the first pole-voltage signal $V^*_{an}$, the second pole-voltage signal $V^*_{bn}$ and the third pole-voltage signal $V^*_{cn}$ are compared with a carrier wave 302 as shown in FIG. 3. Although the carrier wave 302 shown in FIG. 3 is a triangular carrier wave, other types of carrier waves may also be used depending on the modulation scheme. As shown in FIG. 3, the frequency of the carrier wave 302 is equal to the switching frequency. The peak has the maximum value of $V_{dc}/2$ and the minimum value of $-V_{dc}/2$.

In the related art, as shown in FIG. 3, the difference between each of the pole-voltage signals 201 and the carrier wave 302 is calculated, and the value of 1 is output if the difference is equal to or greater than 0, and the value of 0 is output if the difference is less than 0 (as indicated by reference numeral 303). Accordingly, an on-signal is output to the switching elements a1, b1 and c1 if the difference between each of the pole-voltage signals 201 and the carrier wave 302 is greater than 0, and an on-signal is output to the switching elements a2, b2 and c2 if the difference between each of the pole-voltage signals 201 and the carrier wave 302 is less than 0 by NOT gates 304.

In the processes of generating control signals by the PWM control unit 104 in the related art as shown in FIGS. 2 and 3, the modulation mode is finally determined based on the offset voltage $V^*_{sn}$ generated in the offset voltage generator 202. For example, the offset voltage $V^*_{sn}$ for sinusoidal PWM (SPWM), which is a continuous modulation mode, is as follows:

$$v^*_{sn} = 0 \quad \text{[Equation 2]}$$

In addition, the offset voltage $V^*_{sn}$ for space vector PWM (SVPWM) is as follows:

$$v^*_{sn} = -\frac{v_{max} + v_{min}}{2} \quad \text{[Equation 3]}$$

where $V_{max}$ denotes the largest one of the first phase-voltage signal $V^*_{as}$, the second phase-voltage signal $V^*_{bs}$ and the third phase-voltage signal $V^*_{cs}$, and $V_{min}$ denotes the smallest one thereof. The space vector PWM (SVPWM) expressed in Equation 3 is a continuous modulation scheme in which control signals for all of the switching elements are changed for a cycle of a carrier wave.

In contrast, in a discontinuous modulation scheme, a control signal for a switching element in a phase does not change, in order to reduce switching loss. One of the most commonly used discontinuous voltage modulation scheme is 60° discontinuous PWM (DPWM), in which switching discontinuous periods of 60° exist around the peak of a phase-voltage signal. The 60° DPWM has the offset voltage $V^*_{sn}$ as follows:

$$v^*_{sn} = \frac{V_{dc}}{2} - v_{max} \quad (\text{if, } v_{max} + v_{min} \geq 0)$$
$$v^*_{sn} = \frac{V_{dc}}{2} - v_{min} \quad (\text{if, } v_{max} + v_{min} < 0) \quad \text{[Equation 4]}$$

As described above, in the PWM control using the offset voltage, different offset voltages have to be calculated in order to switch from the continuous modulation mode to the discontinuous modulation mode, as expressed in Equations 2 to 4.

In addition, there is a drawback in the related art in that although switching loss is reduced, the total harmonic distortion (THD) in an output current increases. Further, there is a drawback in the related art in that although the THD in the output current is low in comparison with the discontinuous modulation mode, switching loss increases.

In addition, according to the existing discontinuous modulation mode using the offset voltage, the discontinuous modulation interval is always set to 120° of a cycle of a reference wave. Accordingly, when the modulation index MI is low, the THD in the output current is very large in the discontinuous modulation mode. As a result, there is another problem in the modulation index by which discontinuous modulation starts is restricted in order to reduce switching loss.

In addition, according to the above-described existing voltage modulation schemes using offset voltage, the offset voltage is continuously generated even in a period where the offset voltage is not necessary and introduced into the inverter via the PWM control unit 104. The offset voltage is zero sequence voltage and may result in reduction in the power efficiency or malfunction of a load connected to the inverter. For example, if such zero sequence voltage is applied to an ESS using a grid connected inverter or a photovoltaic module, leakage current may be generated such that power efficiency may be reduced. In addition, in driving a typically induction motor, if zero sequence voltage becomes larger, torque in the axial direction or bearing current becomes large, possibly causing dielectric breakdown.

In order to overcome such problems, there are provided an offset voltage generator and a method for generating an offset voltage of a three-phase inverter that allow voltage modulation mode of the three-phase inverter to switch from a continuous modulation mode to a discontinuous modulation mode without additionally calculating another offset voltage. Moreover, in the offset voltage generator and the method for generating offset voltage according to an embodiment of the present disclosure, an offset voltage having the minimum RMS is generated to be introduced into the inverter and thus the zero sequence voltage is minimized, thereby preventing reduction in power efficiency and malfunction of a load driven by the inverter.

Figure 4:
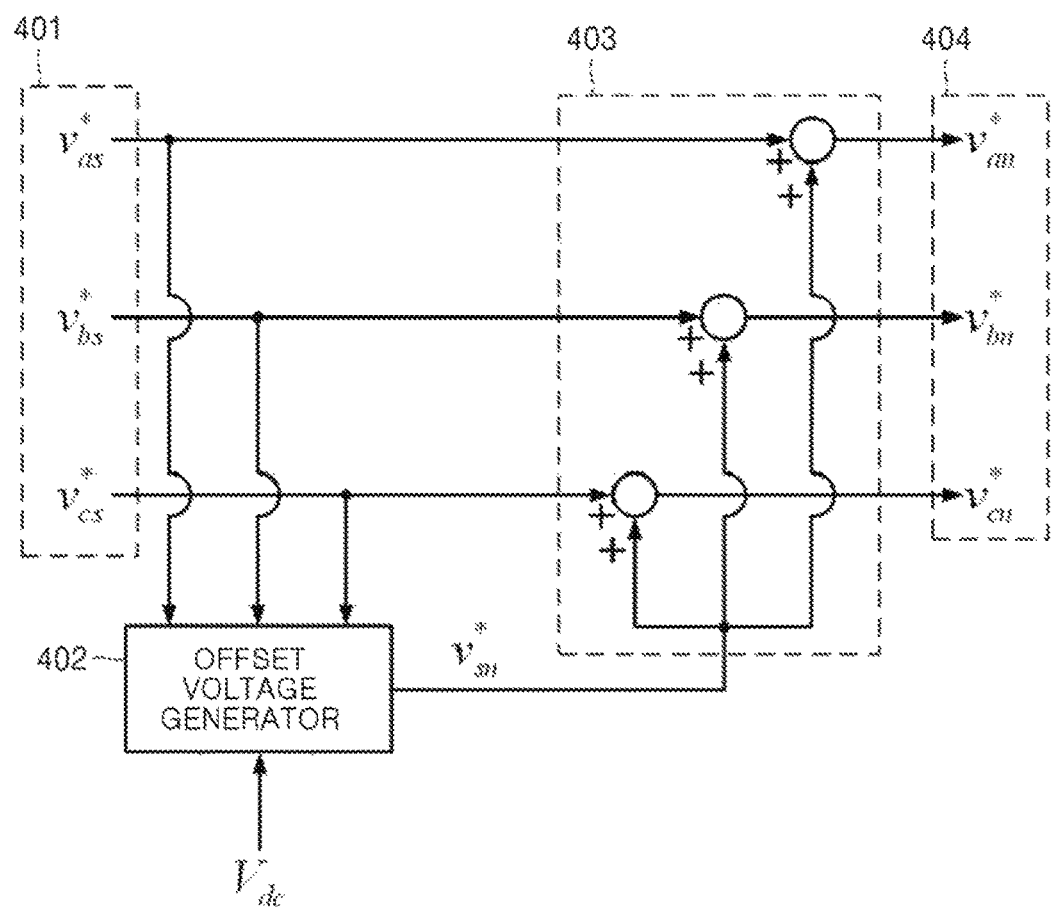
FIG. 4 is a block diagram of a pole-voltage signal generator included in a PWM control unit according to an embodiment of the present disclosure.

FIG. 4 is a block diagram of a pole-voltage signal generator included in a PWM control unit 104 according to an embodiment of the present disclosure.

Referring to FIG. 4, the pole-voltage signal generator adds three phase-voltage signals 401 including a first phase-voltage signal $V^*_{as}$, a second phase-voltage signal $V^*_{bs}$ and a third phase-voltage signal $V^*_{cs}$ to an offset voltage $V^*_{sn}$ generated in an offset voltage generator 402, respectively, (as indicated by reference numeral 403), thereby generating three-phase pole-voltage signals 404 including a first pole-voltage signal $V^*_{an}$, a second pole-voltage signal $V^*_{bn}$ and a third pole-voltage signal $V^*_{cn}$.

In FIG. 4, the offset voltage generator 402 according to the embodiment of the present disclosure generates an offset voltage $V^*_{sn}$ by using phase-voltage signals 401 and a DC link voltage $V_{dc}$ of the three-phase inverter.

The offset voltage $V^*_{sn}$ of of the inverter of FIG. 1 has the range as expressed in Equation 5 below:

$$-\frac{V_{dc}}{2} - v_{min} \leq v^*_{sn} \leq \frac{V_{dc}}{2} - v_{max} \quad \text{[Equation 5]}$$

If $$\frac{V_{dc}}{2} < v_{max}$$

in Equation 5, $$-\frac{V_{dc}}{2} - v_{min} \leq v^*_{sn} \leq \frac{V_{dc}}{2} - v_{max} \leq 0$$

is established. That is, the offset voltage having the minimum absolute value becomes $$\frac{V_{dc}}{2} - v_{max}.$$

On the other hand, if $$-\frac{V_{dc}}{2} - v_{min}, 0 \le -\frac{V_{dc}}{2} - v_{min} \le v_{sn}^* \le \frac{V_{dc}}{2} - v_{max}$$

is established, such that the offset voltage having the minimum absolute value becomes $$-\frac{V_{dc}}{2} - v_{min}.$$

Accordingly, the offset voltage generated by the offset voltage generator according to the embodiment of the present disclosure is defined as follows:

$$v_{sn}^* = 0 \quad \left(\text{if}, -\frac{V_{dc}}{2} \le v_{max}, v_{min} \le \frac{V_{dc}}{2}\right) \quad \text{[Equation 6]}$$

$$v_{sn}^* = \frac{V_{dc}}{2} - v_{max} \quad \left(\text{if}, \frac{V_{dc}}{2} \le v_{max}\right)$$

$$v_{sn}^* = -\frac{V_{dc}}{2} - v_{min} \quad \left(\text{if}, v_{min} \le -\frac{V_{dc}}{2}\right)$$

Hereinafter, a process of generating an offset voltage $V^*_{sn}$ by the offset voltage generator 402 according to Equation 6 will be described in detail with reference to FIG. 5.

Figure 5:
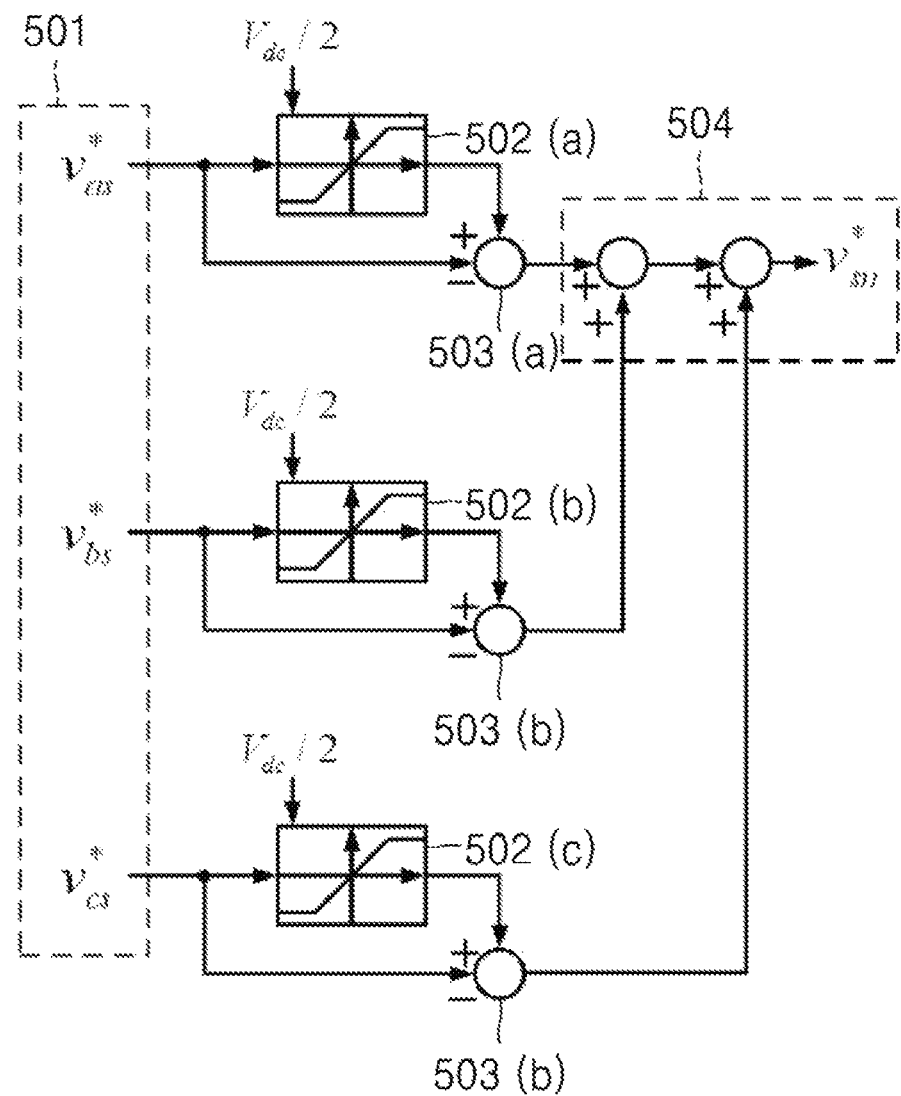
FIG. 5 is block diagram of the offset voltage generator according to an embodiment of the present disclosure.

FIG. 5 is block diagram of the offset voltage generator 402 according to an embodiment of the present disclosure.

Referring to FIG. 5, the offset voltage generator 402 according to the embodiment generates three-phase voltage signals $V^*_{as}$, $V^*_{bs}$ and $V^*_{cs}$ and corresponding limiting signals Vas, Vbs and Vcs, respectively, according to Equation 7 below:

$$v^*_{sn} = -(v^*_{as} - v_{as} + v^*_{bs} - v_{bs} + v^*_{cs} - v_{cs}) \quad \text{[Equation 7]}$$

where the limit signals Vas, Vbs and Vcs are defined as follows:

$$v_{as} = \text{bound}\left(-\frac{V_{dc}}{2}, \frac{V_{dc}}{2}, v^*_{as}\right) \quad \text{[Equation 8]}$$

$$v_{bs} = \text{bound}\left(-\frac{V_{dc}}{2}, \frac{V_{dc}}{2}, v^*_{bs}\right)$$

$$v_{cs} = \text{bound}\left(-\frac{V_{dc}}{2}, \frac{V_{dc}}{2}, v^*_{cs}\right)$$

where the function bound ( ) is defined as follows:

$$\text{bound}(a, b, x) = \begin{cases} a & (\text{if } x < a) \\ b & (\text{if } x > b) \\ x & (\text{if } a \le x \le b) \end{cases} \quad \text{[Equation 9]}$$

The offset voltage generator 402 according to the embodiment of the present disclosure generates the offset voltage $V^*_{sn}$ as expressed in Equation 7 in the following manner. Referring to FIG. 5, the offset voltage generator 402 according to the embodiment of the present disclosure includes a first limiter 502(a), a second limiter 502(b) and a third limiter 502(c) respectively corresponding to the first phase-voltage signal $V^*_{as}$, the second phase-voltage signal $V^*_{bs}$ and the third phase-voltage signal $V^*_{cs}$.

The first limiter 502(a) receives the first phase-voltage signal $V^*_{as}$ and compares the received first phase-voltage signal $V^*_{as}$ with the maximum limit value and the minimum limit value to output the first limit signal Vas. In this embodiment, the maximum limit value may be set to $$\frac{V_{dc}}{2},$$

and the minimum limit value may be set to $$-\frac{V_{dc}}{2}.$$

In this embodiment, the first limiter 502(a) outputs the first phase voltage signal $V^*_{as}$ as the first limit signal Vas if the first phase voltage signal $V^*_{as}$ is equal to or greater than the minimum limit value and equal to or less than the maximum limit value. In addition, the first limiter 502(a) outputs the minimum limit value as the first limit signal Vas if the first phase voltage signal $V^*_{as}$ is less than the minimum limit value. In addition, the first limiter 502(a) outputs the maximum limit value as the first limit signal Vas if the first phase voltage signal $V^*_{as}$ is greater than the maximum limit value.

The second limiter 502(b) and the third limiter 502(c) also output the second limit signal Vbs and the third limit signal Vcs, respectively, in the same manner as the first limiter 502(a) described above.

Then, the 402 outputs, as the offset voltage $V^*_{sn}$, the sum of the difference between the first limit signal Vas and the first phase voltage signal $V^*_{as}$, the difference between the second limit signal Vbs and the second phase voltage signal $V^*_{bs}$, and the difference between the third limit signal Vcs and the third phase voltage signal $V^*_{cs}$, as shown in FIG. 5.

In FIG. 5, the offset voltage $V^*_{sn}$ generated by the offset voltage generator 402 becomes 0 if the three phase-voltage signals 501 are between the minimum limit value and the maximum limit value. When the offset voltage $V^*_{sn}$ is 0, the PWM control unit 104 of FIG. 1 operates in the SPWM mode that is a continuous modulation scheme.

On the other hand, if the phase-voltage signals 501 are greater than the maximum limit value or less than the minimum limit value, the offset voltage becomes $$v^*_{sn} = \frac{V_{dc}}{2} - v_{max} \text{ or } v^*_{sn} = -\frac{V_{dc}}{2} - v_{max}.$$

Accordingly, the pole-voltage signal becomes $V_{dc}/2$ or $-V_{dc}/2$, such that the PWM control unit 104 is switched to the discontinuous modulation mode.

According to the embodiment of the present disclosure, the discontinuous operation range in which the PWM control unit 104 operates in the discontinuous modulation mode is determined by the modulation index MI. The modulation index is defined as expressed in Equation 10 below:

$$MI = \frac{V_m}{V_{dc}/2} \quad \text{[Equation 10]}$$

where $V_m$ denotes the magnitude of phase-voltage signal.

Consequently, the PWM control unit 104 operates in the continuous modulation mode if the modulation index is equal to or less than a predetermined reference index, e.g., 1. Further, the PWM control unit 104 operates in the discontinuous modulation mode if the modulation index is greater than the reference index. In particular, the PWM control unit 104 operates in the 60° DPWM mode when the modulation index becomes the maximum value of the linear modulation region, e.g., $2/\sqrt{3}(=1.1547)$.

As such, according to an embodiment of the present disclosure, the voltage modulation mode of the three-phase inverter can be easily switched from the continuous modulation mode to the discontinuous modulation mode without any additional calculating process. In addition, according to an embodiment of the present disclosure, a discontinuous modulation period is adjusted, such that total harmonic distortion (TED) can be reduced in a period where the modulation index is low compared to the discontinuous modulation scheme in the related art, and switching loss can be reduced in a period where the modulation index is high compared to the continuous modulation scheme in the related art.

Figure 6:
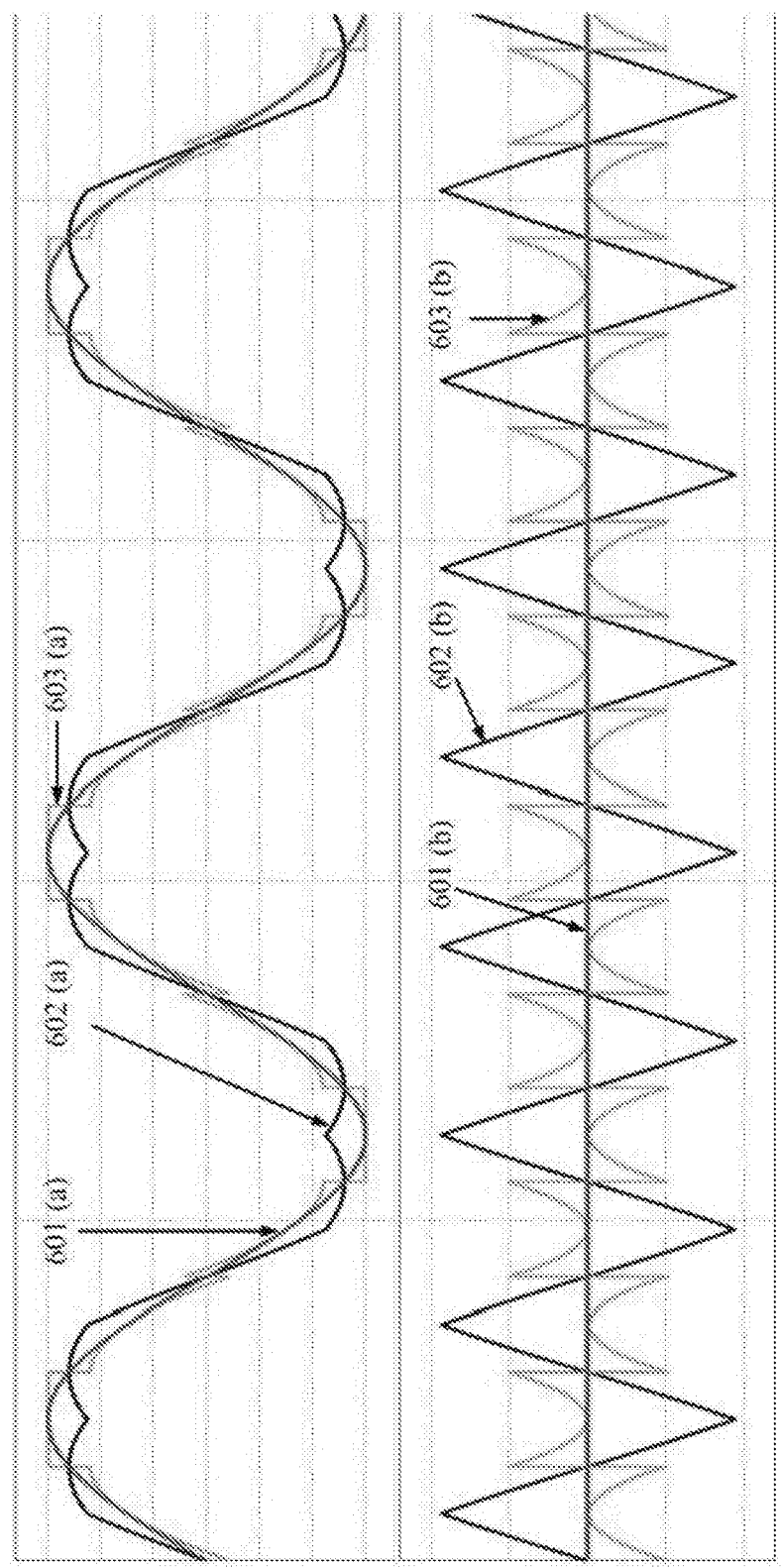
FIGS. 6 to 8 are graphs for comparing waveforms of offset voltages and pole-voltages according to the PWM control scheme of the present disclosure, the SPWM control scheme in the related art, the SVPWM control scheme in the related art and the 60° DPWM in the related art with one another by varying the modulation index MI.
Figure 7:
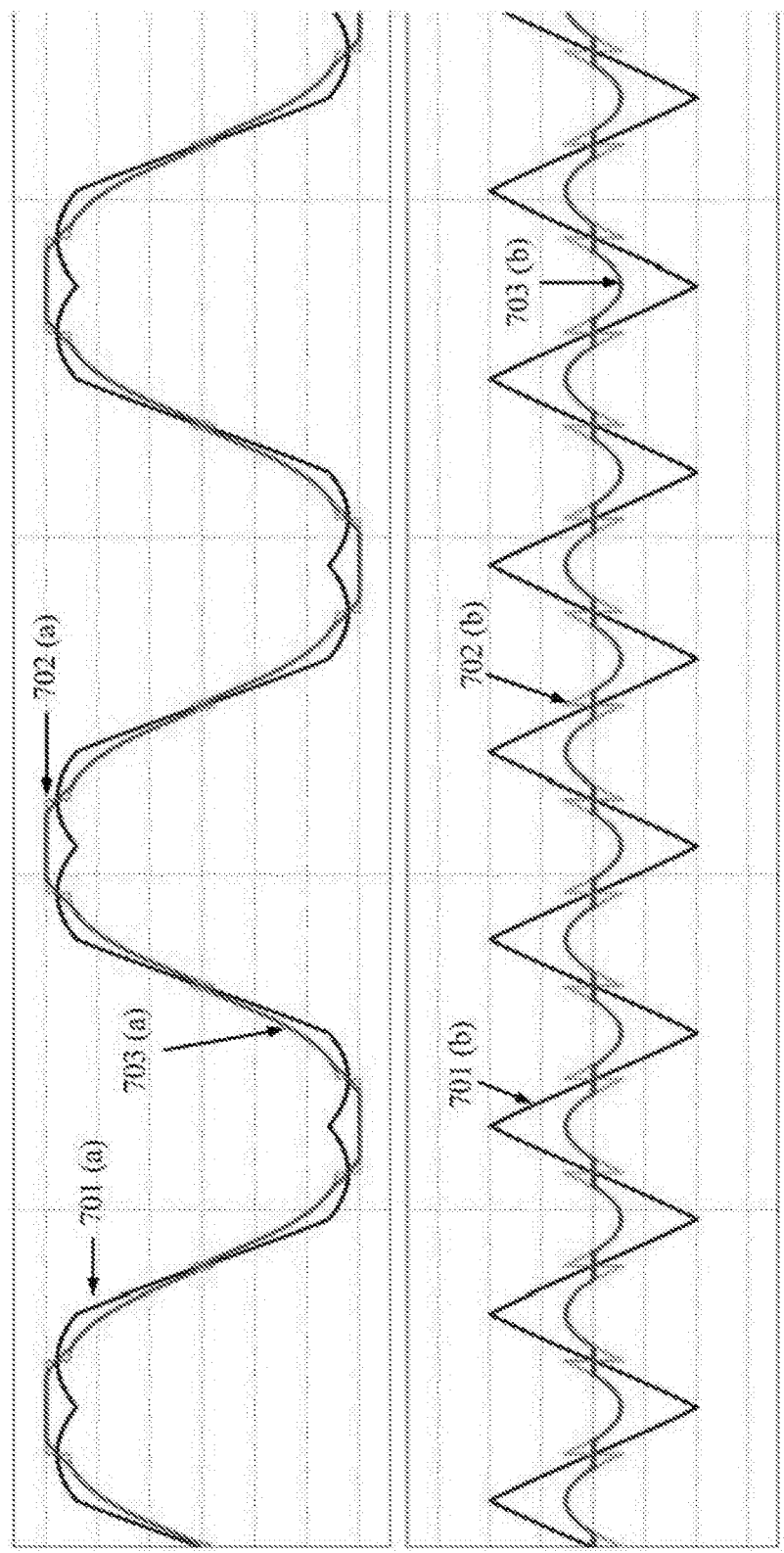
Figure 8:
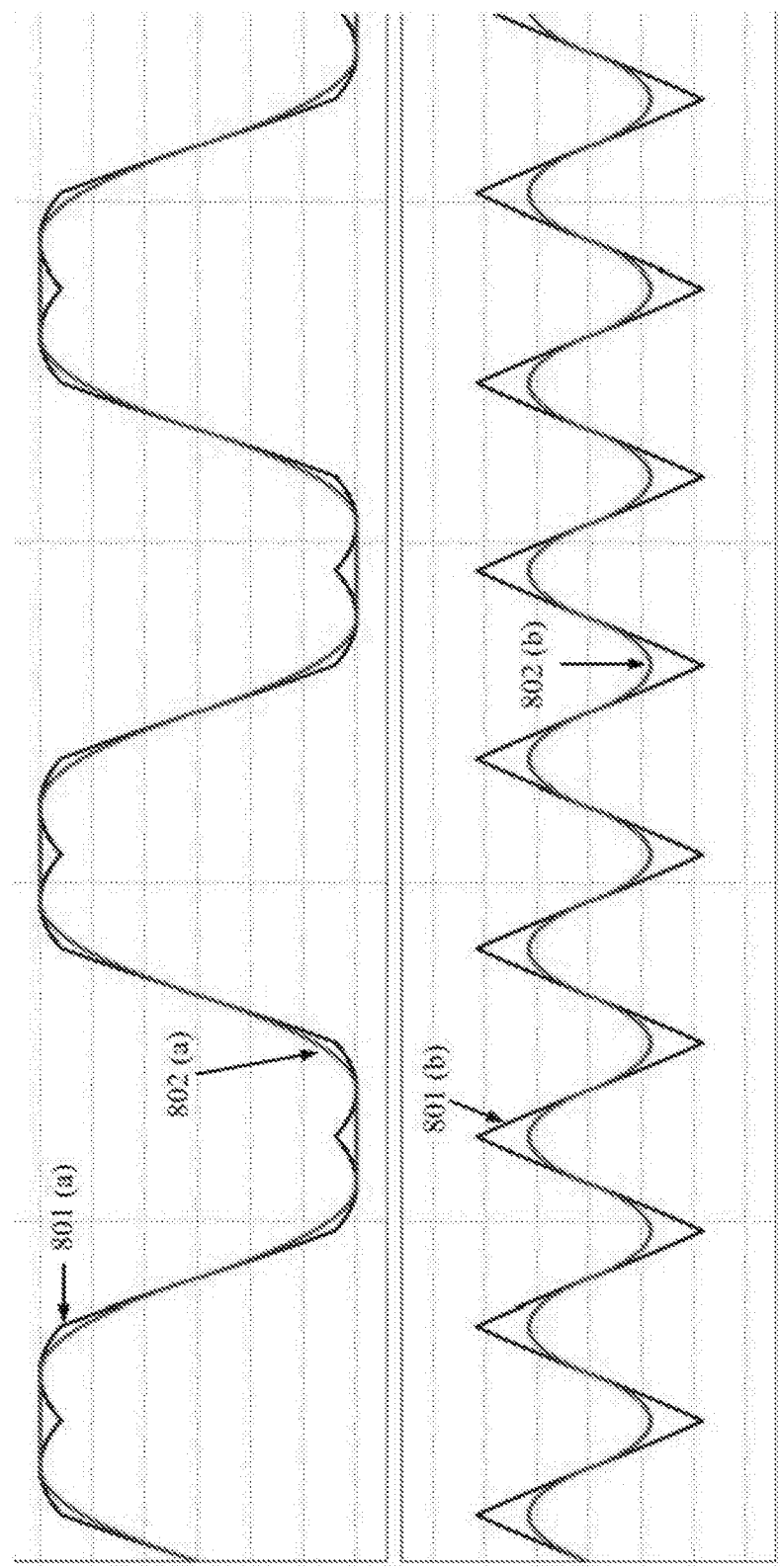

FIGS. 6 to 8 are graphs for comparing waveforms of offset voltages and pole-voltages according to the PWM control scheme of some embodiments of the present disclosure, the SPWM control scheme in the related an, the SVPWM control scheme in the related art and the 60° DPWM in the related art with one another by varying the modulation index MI.

In FIG. 6, the modulation index MI of the PWM control scheme according to the embodiment of the present disclosure is set to 1. FIG. 6 shows a waveform 601(a) of a pole-voltage signal according to the PWM control scheme according to the embodiment of the present disclosure and the SPWM control scheme in the related art, a waveform 602(a) of a pole-voltage signal according to the SVPWM control scheme in the related art, and a waveform 603(a) of a pole-voltage signal according to the 60° DPWM control scheme in the related art.

In addition, FIG. 6 shows a waveform 601(b) of an offset voltage according to the PWM control scheme according to the embodiment of the present disclosure and the SPWM control scheme in the related art, a waveform 602(a) of an offset voltage according to the SVPWM control scheme in the related art, and a waveform 603(a) of an offset voltage according to the 60° DPWM control scheme in the related art.

As shown in FIG. 6, according to the PWM control scheme of an embodiment of the present disclosure, the PWM control unit 104 operates in the same manner as the SPWM control scheme in the related art if the modulation index MI is set to 1 or less.

In FIG. 7, the modulation index MI of the PWM control scheme according to the embodiment of the present disclosure is set to 1.7. FIG. 7 shows a waveform 701(a) of a pole-voltage signal according to the SPWM control scheme in the related art, a waveform 702(a) of a pole-voltage signal according to the 60° DPWM control scheme in the related art, and a waveform 703(a) of a pole-voltage signal according to the PWM control scheme of some embodiments of the present disclosure.

FIG. 7 shows a waveform 701(b) of an offset voltage according to the SPWM control scheme in the related art, a waveform 702(b) of an offset voltage according to the 60° DPWM control scheme in the related art, and a waveform 703(b) of an offset voltage according to the PWM control scheme of some embodiments of the present disclosure.

As shown in FIG. 7, the discontinuous modulation period according to the PWM control scheme of some embodiments of the present disclosure is longer as the modulation index MI is greater than 1.

In FIG. 8, the modulation index MI of the PWM control scheme according to the embodiment of the present disclosure is set to $2/\sqrt{3}$. FIG. 8 shows a waveform 801(a) of a pole-voltage signal according to the SVPWM control scheme in the related art, and a waveform 802(a) of a pole-voltage signal according to the 60° DPWM control scheme and the PWM control scheme of some embodiments of the present disclosure.

In addition, FIG. 8 shows a waveform 801(b) of an offset voltage according to the SVPWM control scheme in the related art, and a waveform 802(a) of an offset voltage according to the 60° DPWM control scheme and the PWM control scheme of some embodiments of the present disclosure.

As shown in FIG. 8, when the modulation index MI becomes the maximum value of $2/\sqrt{3}$, the PWM control unit 104 according to the embodiment of the present disclosure operates in the same manner as in the 60° DPWM control scheme in the related art, such that it has the maximum discontinuous modulation period for a cycle.

In particular, as can be seen from FIGS. 7 and 8, according to the PWM control scheme of some embodiments of the present disclosure, an offset voltage having the minimum absolute value is generated if the modulation index MI is between 1 and the maximum value of $2/\sqrt{3}$.

Figure 9:
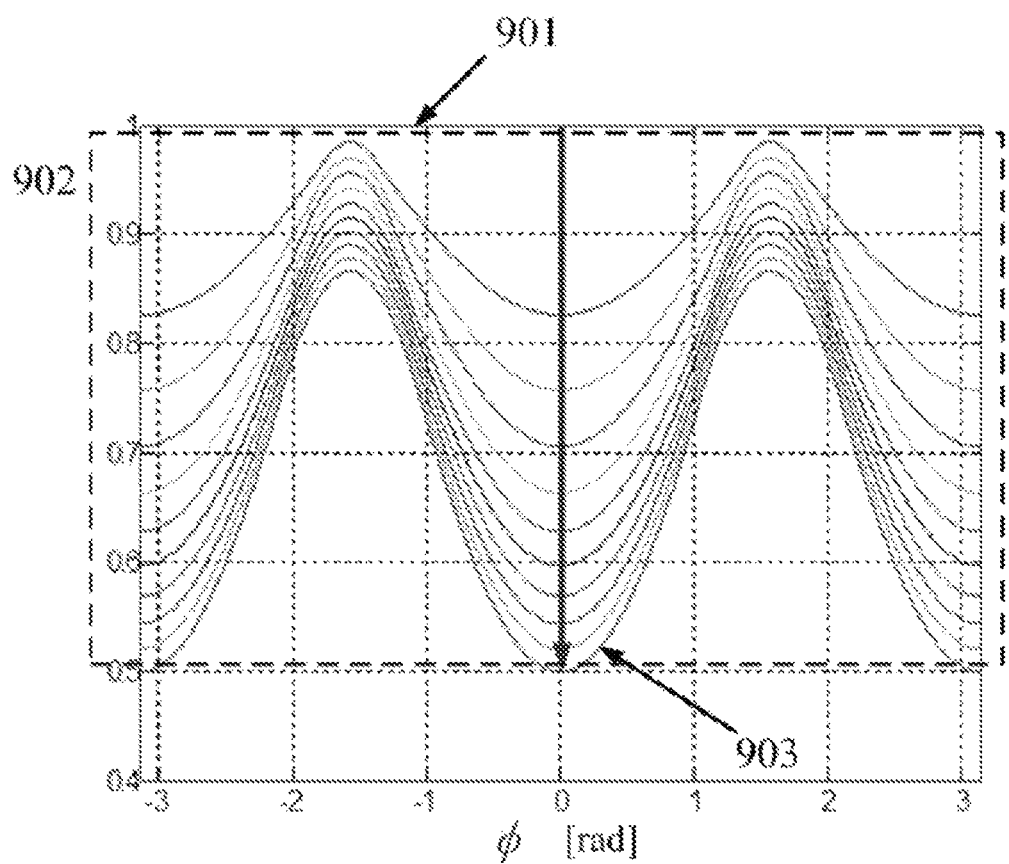
FIG. 9 is a graph showing a ratio of switching loss in each of the modulation schemes with respect to switching loss in the continuous modulation scheme according to power factor, according to an embodiment of the present disclosure.

FIG. 9 is a graph showing a ratio of switching loss in each of the modulation schemes with respect to switching loss in the continuous modulation scheme according to power factor.

FIG. 9 shows switching loss 901 in the continuous modulation scheme, e.g., the SPWM and SVPWM scheme, and switching loss 903 in the discontinuous modulation scheme, e.g., the 60° DPWM scheme. In addition, FIG. 9 shows switching loss 902 as the modulation index MI is changed from 1 to $2/\sqrt{3}$ according to the PWM control scheme of embodiments of the present disclosure.

As shown in FIG. 9, the switching loss 902 in the PWM control scheme of some embodiments the present disclosure is equal to that of the SPWM, e.g., the continuous voltage modulation scheme when the modulation index MI is 1, and the switching loss 902 gradually decreases as the discontinuous modulation period increases if the modulation index MI is greater than 1. In particular, it can be seen from FIG. 9 that the switching loss 902 is equal to the switching loss 903 in the 60° DPWM when the modulation index MI is the maximum value of $2/\sqrt{3}$.

Figure 10:
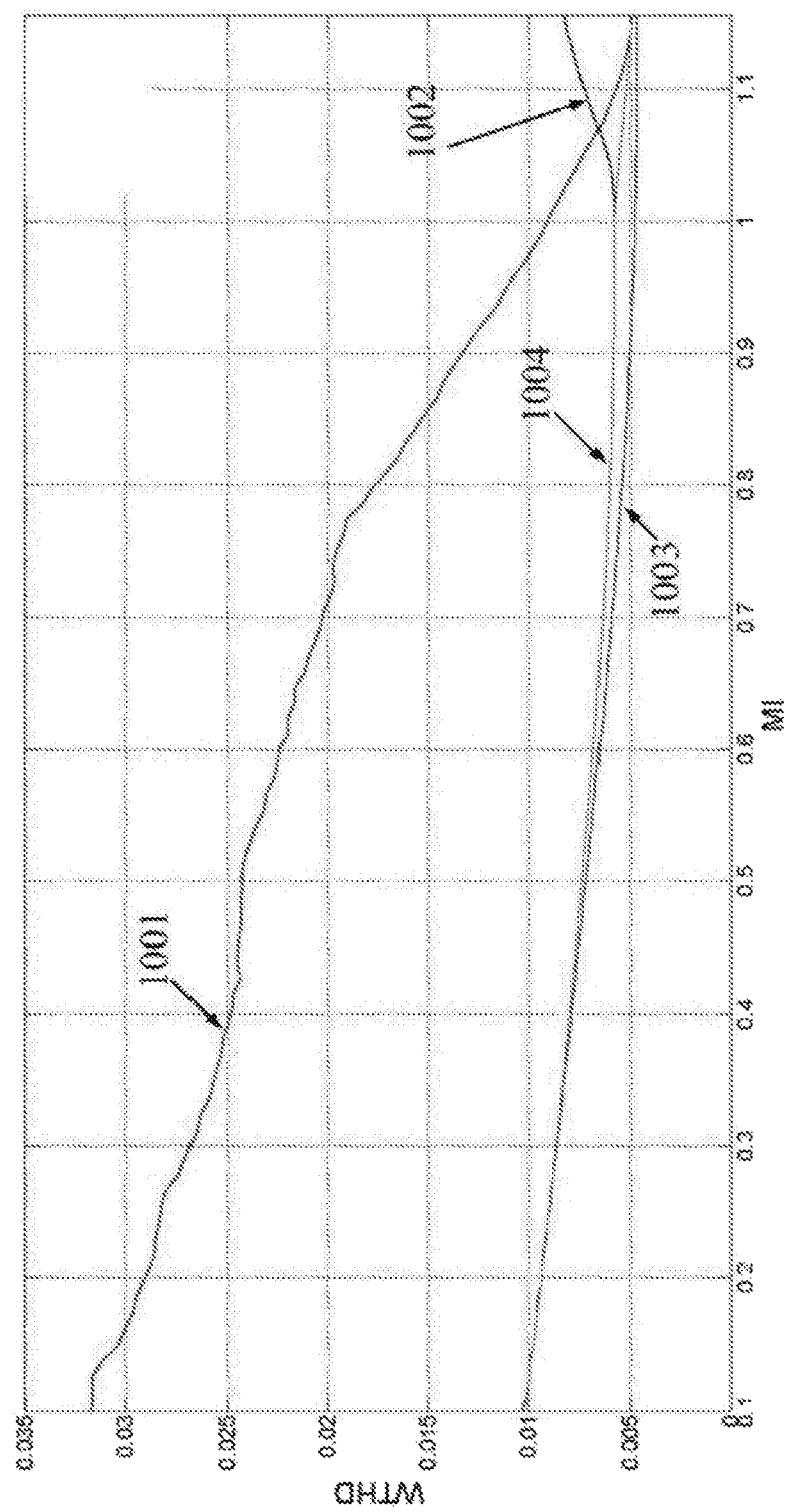
FIG. 10 is a graph for comparing weighted total harmonic distortion (WTHD) in the continuous modulation scheme and discontinuous modulation scheme in the related art with WTHD in the method for generating offset voltage according to an embodiment of the present disclosure.

FIG. 10 is a graph for comparing weighted total harmonic distortion (WTHD) in the continuous modulation scheme and discontinuous modulation scheme in the related art with WTHD in the method for generating offset voltage according to an embodiment of the present disclosure.

The WTHD shown in FIG. 13 is defined as follows:

$$WTHD = \frac{\sqrt{\sum_{n=2}^{\infty}\left(\frac{V_n}{n\omega_1 L}\right)^2}}{\frac{V_1}{\omega_1 L}} = \frac{\sqrt{\sum_{n=2}^{\infty}\left(\frac{V_n}{n}\right)^2}}{V_1} \quad \text{[Equation 11]}$$

where ω1 denotes the frequency of fundamental wave, V1 denotes the magnitude of fundamental wave, n denotes the order of harmonic, and $V_n$ denotes the magnitude of n-order harmonic.

FIG. 10 shows WTHD 1001 in 60° DPWM scheme in the related art, WTHD 1002 in SPWM scheme in the related art, WTHD 1003 in SVPWM scheme in the related art, and WTHD 1004 in PWM control scheme according to an embodiment of the present disclosure.

As shown in FIG. 13, the WTHD 1004 in the PWM control scheme according to the embodiment of the present disclosure is identical to the WTHD 1002 in the SPWM scheme in the related art when the modulation index MI is equal to or less than the reference index of 1. However, when the modulation index MI becomes larger than the reference index of 1, the discontinuous modulation interval increases, such that the WTHD 1004 gradually increases. Even though the WTHD 1004 in PWM scheme according to the embodiment of the present disclosure increases, it always remains lower than the WTHD 1001 in the 60° DPWM scheme in the related art.

The PWM control scheme according to the embodiment of the present disclosure described above is a voltage modulation method in which a zero sequence voltage or an offset voltage calculated using the phase-voltage signals, the limiters and the weight are compared with a triangular wave. The smooth switching from the continuous voltage modulation mode to the discontinuous voltage modulation mode can be achieved by adding up differences between phase-voltage signals and respective limit voltage signals after having passed the limiters. In addition, the discontinuous voltage modulation period can be adjusted by adjusting the maximum limit value and the minimum limit value input to the limiters.

By utilizing the offset voltage thus generated, the PWM control unit operates in the continuous modulation mode when the modulation index is set to a value below the reference index of 1, whereas the PWM control unit is switched to the discontinuous modulation mode when the modulation index becomes larger than the reference index of I. By applying the PWM control scheme according to an embodiment of the present disclosure to an inverter for an ESS, an inverter for a photovoltaic module, an inverter for motor drive, etc., the discontinuous modulation period can be adjusted, such that the THD can be reduced even in a period where the modulation index is low compared to the discontinuous modulation scheme in the related art. Further, switching loss can also be reduced in a period where third modulation index is high compared to the continuous modulation scheme in the related art. Moreover, in the offset voltage generator and the method for generating offset voltage according to an embodiment of the present disclosure, an offset voltage having the minimum RMS is generated to be introduced into the inverter and thus the zero sequence voltage is minimized, thereby preventing reduction in the power efficiency or malfunction of a load driven by the inverter.

The present disclosure described above may be variously substituted, altered, and modified by those skilled in the art to which the present disclosure pertains without departing from the scope and sprit of the present disclosure. Therefore, the present disclosure is not limited to the described embodiments and the accompanying drawings.

What is claimed is:

1. An offset voltage generator in a three-phase inverter, the three-phase inverter operating in a continuous modulation mode or a discontinuous modulation mode, the offset voltage generator comprising:
    a first limiter configured to compare a first phase-voltage signal with a maximum limit value and a minimum limit value to output a first limit-voltage signal;
    a second limiter configured to compare a second phase-voltage signal with the maximum limit value and the minimum limit value to output a second limit-voltage signal;
    a third limiter configured to compare a third phase-voltage signal with the maximum limit value and the minimum limit value to output a third limit-voltage signal; and
    a summer configured to add a difference between the first phase-voltage signal and the first limit-voltage signal, a difference between the second phase-voltage signal and the second limit-voltage signal, and a difference between the third phase-voltage signal and the third limit-voltage signal, to output an offset voltage,
    wherein the summer outputs a different offset voltage depending on a modulation index determined by a DC link voltage of the three-phase inverter to switch between the modulation modes of the three-phase inverter.

2. The offset voltage generator of claim 1, wherein the first limiter, the second limiter and the third limiter are configured to:
    output the first phase-voltage signal as the first limit-voltage signal, the second phase-voltage signal as the second limit-voltage signal, and the third phase-voltage signal as the third limit-voltage signal, respectively, if the first phase-voltage signal, the second phase-voltage signal and the third phase-voltage signal are between the minimum limit value and the maximum limit value;
    output the minimum limit value as the first limit-voltage signal, as the second limit-voltage signal, and as the third limit-voltage signal, respectively, if the first phase-voltage signal, the second phase-voltage signal and the third phase-voltage signal are less than the minimum limit value; and
    output the maximum limit value as the first limit-voltage signal, as the second limit-voltage signal, and as the third limit-voltage signal, respectively, if the first phase-voltage signal, the second phase-voltage signal and the third phase-voltage signal are greater than the maximum limit value.

3. The offset voltage generator of claim 1, wherein the three-phase inverter operates in the continuous modulation mode if the first phase-voltage signal, the second phase-voltage signal and the third phase-voltage signal are between the minimum limit value and the maximum limit value, and
    the three-phase inverter operates in the discontinuous modulation mode if the first phase-voltage signal, the second phase-voltage signal and the third phase-voltage signal are less than the minimum limit value or greater than the maximum limit value.

4. The offset voltage generator of claim 1, wherein the three-phase inverter operates in the continuous modulation mode if the modulation index of the three-phase inverter is equal to or less than a reference index, and the three-phase inverter operates in the discontinuous modulation mode if the modulation index of the three-phase inverter is greater than the reference index.

5. A three-phase inverter control device for controlling switching operations of a plurality of switching elements in a three-phase inverter, the three-phase inverter control device comprising:

a pole-voltage signal generator configured to compare a first phase-voltage signal, a second phase-voltage signal and a third phase-voltage signal with a maximum limit value and a minimum limit value, respectively, to generate an offset voltage, and add the offset voltage to the first phase-voltage signal, the second phase-voltage signal and the third phase-voltage signal to generate a first pole-voltage signal, a second pole-voltage signal and a third pole-voltage signal, respectively; and a control signal generator configured to compare the first pole-voltage signal, the second pole-voltage signal and the third pole-voltage signal with a carrier wave, to generate a control signal for the plurality of switching elements, wherein the three-phase inverter operates in different modulation modes depending on a modulation index determined by a DC link voltage of the three-phase inverter and the offset voltage.

6. The three-phase inverter control device of claim 5, wherein the pole-voltage signal generator comprises an offset voltage generator configured to generate the offset voltage, and the offset voltage generator comprises:

a first limiter configured to compare the first phase-voltage signal with a maximum limit value and a minimum limit value to output a first limit-voltage signal;

a second limiter configured to compare a second phase-voltage signal with the maximum limit value and the minimum limit value to output a second limit-voltage signal;

a third limiter configured to compare a third phase-voltage signal with the maximum limit value and the minimum limit value to output a third limit-voltage signal; and a summer configured to add up a difference between the first phase-voltage signal and the first limit-voltage signal, a difference between the second phase-voltage signal and the second limit-voltage signal, and a difference between the third phase-voltage signal and the third limit-voltage signal, to output an offset voltage.

7. The three-phase inverter control device of claim 5, wherein the three-phase inverter operates in a continuous modulation mode if the first phase-voltage signal, the second phase-voltage signal and the third phase-voltage signal are between the minimum limit value and the maximum limit value, and the three-phase inverter operates in a discontinuous modulation mode if the first phase-voltage signal, the second phase-voltage signal and the third phase-voltage signal are less than the minimum limit value or greater than the maximum limit value.

8. The three-phase inverter control device of claim 5, wherein the three-phase inverter operates in a continuous modulation mode if the modulation index of the three-phase inverter is equal to or less than a reference index, and the three-phase inverter operates in a discontinuous modulation mode if the modulation index of the three-phase inverter is greater than the reference index.

* * * * *